United States Patent [19]

Smith

[11] Patent Number: 5,235,472

[45] Date of Patent: Aug. 10, 1993

[54] APPARATUS FOR SENSING OPERATING SHOCK ON A DISK DRIVE

[75] Inventor: Robert F. Smith, San Jose, Calif.

[73] Assignee: Seagate Technology, Inc., Scotts Valley, Calif.

[21] Appl. No.: 779,214

[22] Filed: Oct. 18, 1991

[51] Int. Cl.⁵ .............................................. G11B 15/04
[52] U.S. Cl. ....................................... 360/60; 360/69
[58] Field of Search ............... 310/312, 328, 338, 339, 310/340, 344, 348, 354, 360, 367, 368, 330, 333; 360/60, 66, 69; 73/517 R, 517 AV

[56] References Cited

U.S. PATENT DOCUMENTS

| | | | |
|---|---|---|---|
| 3,304,787 | 2/1967 | Chiku et al. | 73/517 R |
| 3,363,471 | 1/1968 | Lovelace et al. | 73/517 R |
| 4,413,202 | 11/1983 | Krempl et al. | 310/338 |
| 4,430,895 | 2/1984 | Colton | 73/497 |
| 4,862,298 | 8/1989 | Genheimer et al. | 360/60 |
| 5,003,824 | 4/1991 | Fukada et al. | 310/340 |
| 5,128,581 | 7/1992 | Nakayama et al. | 73/517 R |

Primary Examiner—Aristotelis M. Psitos
Assistant Examiner—P. W. Huber
Attorney, Agent, or Firm—Edward P. Heller, III

[57] ABSTRACT

A shock load detection device mounted on a disk drive unit. The detection device is comprised of a piezoelectric polymer film encapsulated and electrically shielded by a metallic or metallic coated package. Electrical contacts are provided for on the piezoelectric polymer film and are connected to amplification and comparator circuitry which issues a write fault signal upon detection of external force in excess of a predetermined threshold. The shock sensor may be mounted on the computer disk drive of the unit in such a manner as to be at a 45° angle to each of the x, y and z axis of the orthogonal coordinate system so that linear and torsional forces may be monitored.

7 Claims, 9 Drawing Sheets

APPARATUS FOR SENSING OPERATING SHOCK ON A DISK DRIVE

FIELD OF THE INVENTION

This invention relates to the field of shock load detection devices. More specifically, the particular invention relates to a shock load detection device for mounting on a computer disk drive unit which senses mechanical shock imposed thereon or generated thereby and issues a signal to stop writing of the read/write heads.

DESCRIPTION OF THE PRIOR ART

Magnetic head disk drive systems have been widely accepted in the computer industry as a cost effective form of data storage. In a magnetic disk drive system a magnetic disk rotates at high speed while a magnetic read/writes head "flies" slightly over the surface of the rotating disk. The magnetic disk is rotated by means of a spindle drive motor. The magnetic head is suspended over the disk on a spring loaded support arm known as the actuator arm. As the magnetic disk rotates at operating speed the moving air generated by the rotating disk in conjunction with the physical design of the magnetic head operate to lift the magnetic head allowing it to glide over the disk surface on a cushion of air. The flying height of the magnetic head over the disk surface is typically only a few microinches and is primarily a function of disk rotation, the aerodynamic properties of the magnetic head assembly and the force exerted by the spring-loaded actuator arm.

Information is stored on concentric tracks of the magnetic disks. The information is transferred to or read from the disk by means of the flying magnetic head. In order to minimize destruction or distortion of the stored data on the disk, it is necessary that the flying head remain substantially centered on a given track during the write process. A mechanical shock introduced to the system can force the head away from the track center, sometimes into adjacent tracks. If this occurs during write not only is data on the current track corrupted, but data on adjacent tracks may be corrupted. With the introduction of disk drives into portable computers, resistance to shocks or compensation for its effects becomes increasingly important. Prior resistance measures include balancing rotary actuators so that X, Y or Z aligned orthogonal forces exerted on the balanced actuator in response to shock are minimized. However, even balanced actuators are susceptible to rotational (twisting) shock.

Prior compensation methods include disabling write in response to the detection of an off-track condition. This method may be imperfect because indication of a shock may come too late to prevent a write error. Furthermore, the shock may cause a data head position error without any servo head position error detected.

Other prior compensation techniques involve the incorporation of shock sensors in a drive. These sensors generally utilize piezoelectric crystal material as described and set forth in U.S. Pat. No. 4,862,298, incorporated herein by reference. Prior art shock sensors have two notable deficiencies. First, they do not adequately address rotational shock nor are they low cost.

The need for a reliable shock sensor element in disk drives is particularly critical in lap-top and notebook computers. These computers are routinely subjected to operating shocks far in excess of desk top or mainframe applications. The technique set forth in U.S. Pat. No. 4,862,298 does not present a viable or feasible option for small drives associated with lap-top and notebook computers both because of insufficient sensitivity to rotational shock and because of its high cost.

In recent years piezoelectric pressure sensitive elements have found utilization in many applications. Piezoelectric effect is a well known phenomenon which produces an electric impulse in response to pressure applied to piezoelectric sensitive material. Piezoelectric material, as known in the prior art, may utilize dielectric polarization along a known direction of the piezoelectric polymer. Connectors for electronic circuitry are affixed to the piezoelectric material. In response to an applied pressure, an electronic signal is generated and processed through control circuitry.

Piezoelectric polymer materials may be polyvinylidene fluoride (PVDF), copolymers of vinylidene fluoride and trifluoroethylene (VDF/TrFE), copolymers of vinylidene fluoride and tetrafluoroethylene (VDF/TeFE) or copolymers of vinylidene cyanide and vinyl acetate (VDCN/VA). These materials have a variety of manufacturing processes described and well known in the prior art and specifically described in U.S. Pat. Nos. 4,946,913, 4,921,928, and 4,427,609 all incorporated herein by reference. The known prior art fails to teach use of piezoelectric polymers to provide torsional force measurement exerted upon a disk drive machine to issue a write signal.

SUMMARY OF THE INVENTION

The present invention provides a shock load detection device to detect mechanical shock on a disk drive machine. The shock load detector device is designed to fit within the disk drive housing and is capable of monitoring shocks up to 1,000 G's. A "G" is a measurement of acceleration of gravity.

The shock sensor of the present invention utilizes a piezoelectric polymer material mounted within an electrically shielded case which is then mounted at a forty-five degree angle to the read/write surface of the information storage disk of the disk drive. One embodiment of the current invention is to mechanically orient the transducer at a forty-five degree angle to each of the three mutually orthogonal axis (x, y and z) in the coordinate system. The resultant output of the shock sensor provides a signal that can be used for generating a write fault signal to the disk drive independent of the accelerating force direction.

OBJECTS OF THE INVENTION

It is therefore an object of the present invention to provide an apparatus for issuing a stop write signal when excessive acceleration is detected.

A feature of the present invention is utilization of a piezoelectric polymer or copolymer to sense external forces on the disk drive.

An advantage of the present invention is an economical shock sensor comprised in part of a single piezoelectric polymer film that detects applied forces and issues a write fault signal that may be either torsional or linear in nature.

These and other objects, advantages and features of the present invention will become apparent to those skilled in the art after having read the following disclosure of an embodiment and which is illustrated in the following figures.

DETAILED DESCRIPTION OF THE PREFERRED EMBODIMENT

Figure 1:
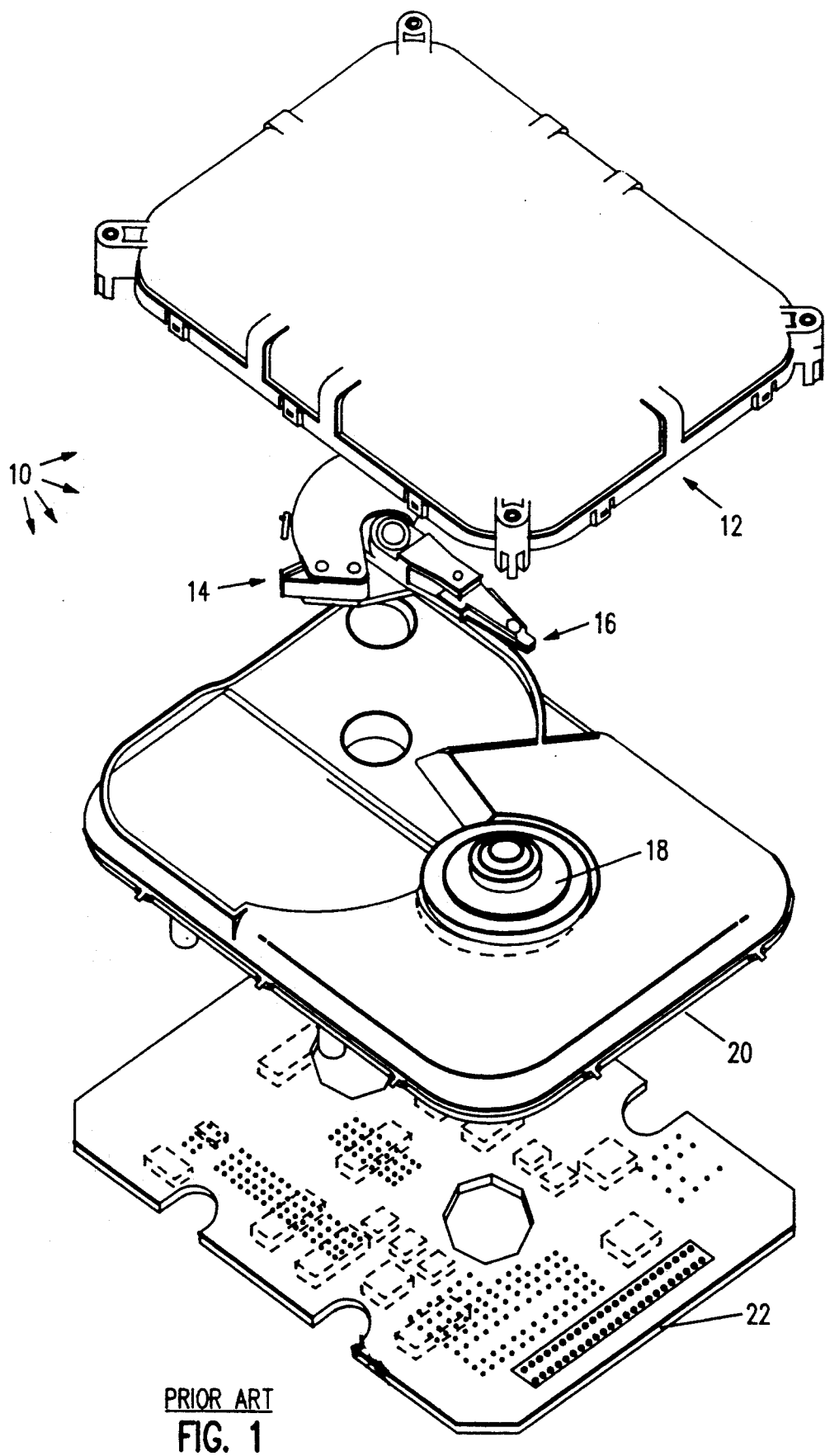
FIG. 1 is an exploded isometric view of the base cover and printed circuit board of disk drive, as known in the prior art.
Figure 2:
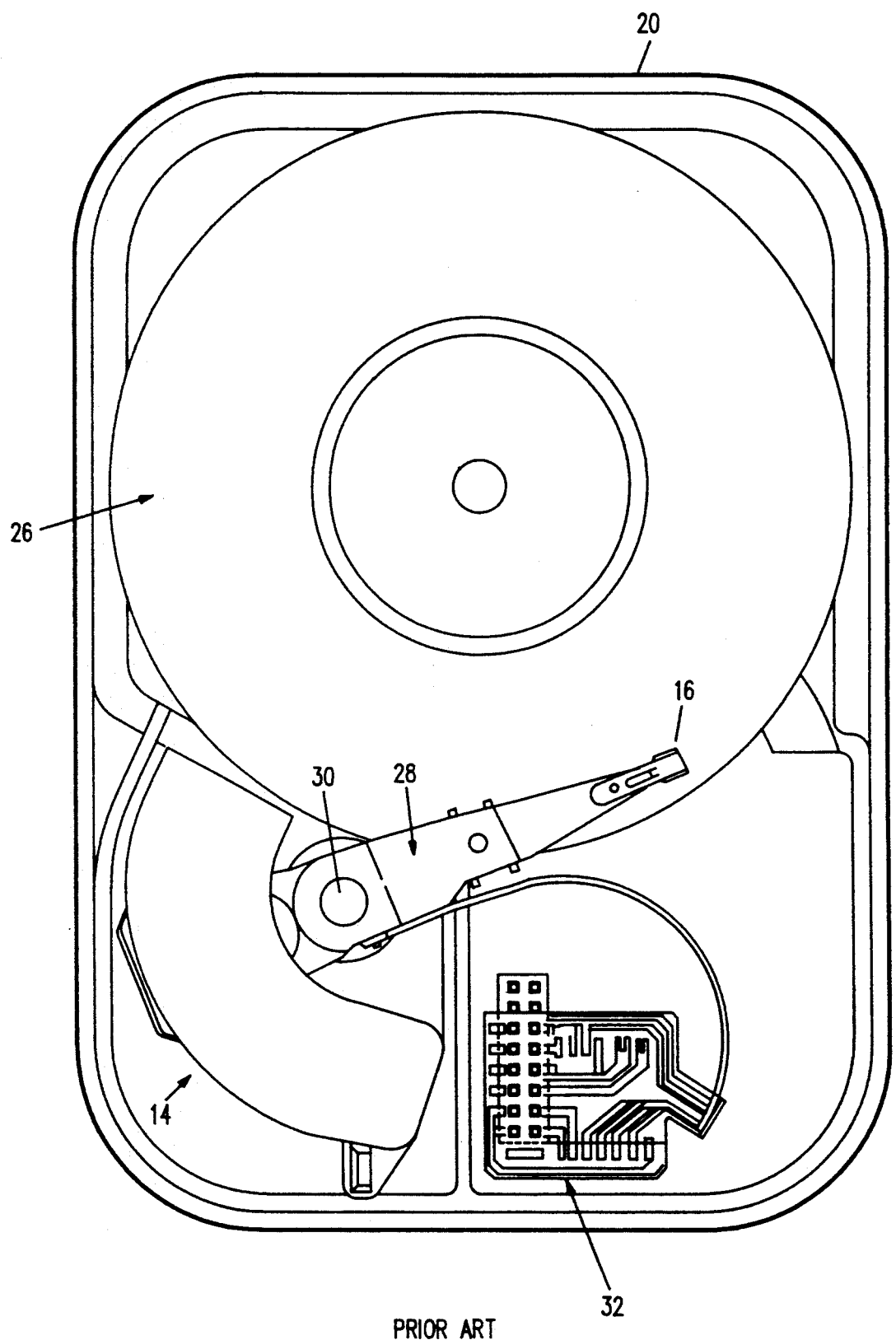
FIG. 2 is a plan view of a disk drive with the top cover removed, as known in the prior art.

With reference to FIG. 1, a disk drive 10 is illustrated and exploded in isometric format The components particularly noted are a top cover 12, an actuator 14, a magnetic head 16, spindle motor 18, bottom cover 20 and a printed circuit board 22 The printed circuit board 22 is depicted in a fashion populated with integrated circuit devices for controlling disk drive operations FIG. 2 is a top plan view of a typical disk drive machine and may be considered the disk drive of FIG. 1. The top casing has been removed and provides a better view of actuator 14, magnetic head 16, and information storage disk 26. Although only one information storage disk is illustrated it should be noted that disk drive machines may be comprised of a plurality of such disks and this illustration is not to be considered a limitation with respect to disk drive machines on which the present invention may operate.

As shown in FIG. 2, the actuator 14 is a voice coil motor (VCM) and is connected to the magnetic head 16 by actuator arm 28, pivotally mounted to shaft 30. Control circuitry 32 is connected to the actuator arm and VCM for generating enabling signals and thereby controlling movement of the magnetic head 16 across the magnetic information storage disk 26 in an arcuate fashion.

Figure 3:
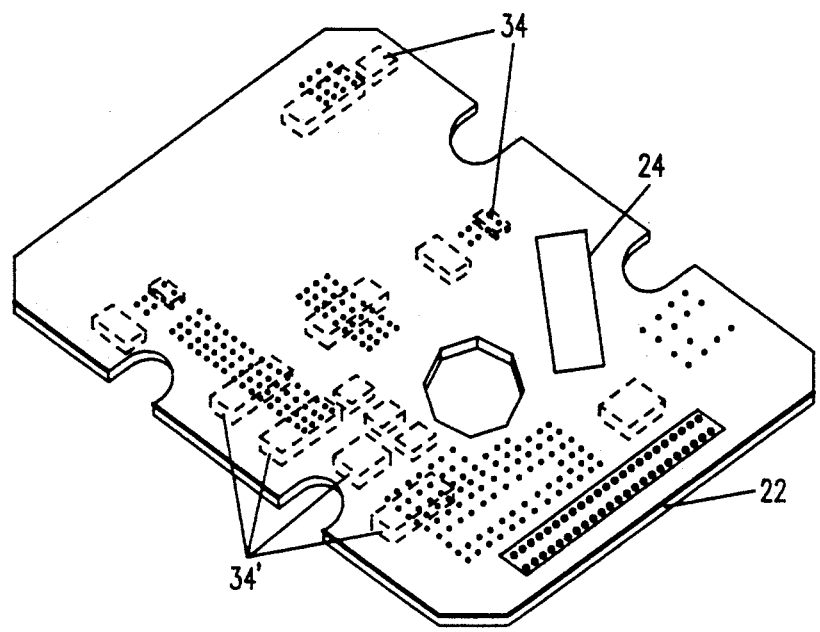
FIG. 3 is an isometric view of a printed circuit board of a disk drive with a shock sensor of the present invention mounted thereon.

FIG. 3 illustrates a printed circuit board of a disk drive embodying a piezoelectric shock sensor of the present invention 24. Device 24 on printed circuit board 22 represents an electrically shielded piezoelectric polymer film having electrical connections for sensing shock loads generated by or applied to disk drive 10. The shock sensor may be mounted in such a manner that the plane of the sensor intersects the x, y and z axis of the printed circuit/drive board 22 (FIG. 3) at an angle of forty-five degrees. Orientation of shock sensor 24 in this manner allows for maximum sensitivity of the planar sensor to both torsional and linear forces applied to the disk drive device.

Additional control circuitry devices 34 and 34' populate the depicted board and may consist of a variety of memory, analog/digital or digital/analog functions.

Device 24 may be applied to printed circuit board 22 by any of a variety of methods such as soldering or gluing. Care must be used when mounting device 24 to board 22 so that the device is not exposed to temperatures in excess of those recommended by the piezoelectric polymer manufacturer. Piezoelectric polymers that are more tolerant of higher temperatures may be utilized to compensate for specific packaging, mounting or other manufacturing techniques.

Figure 4:
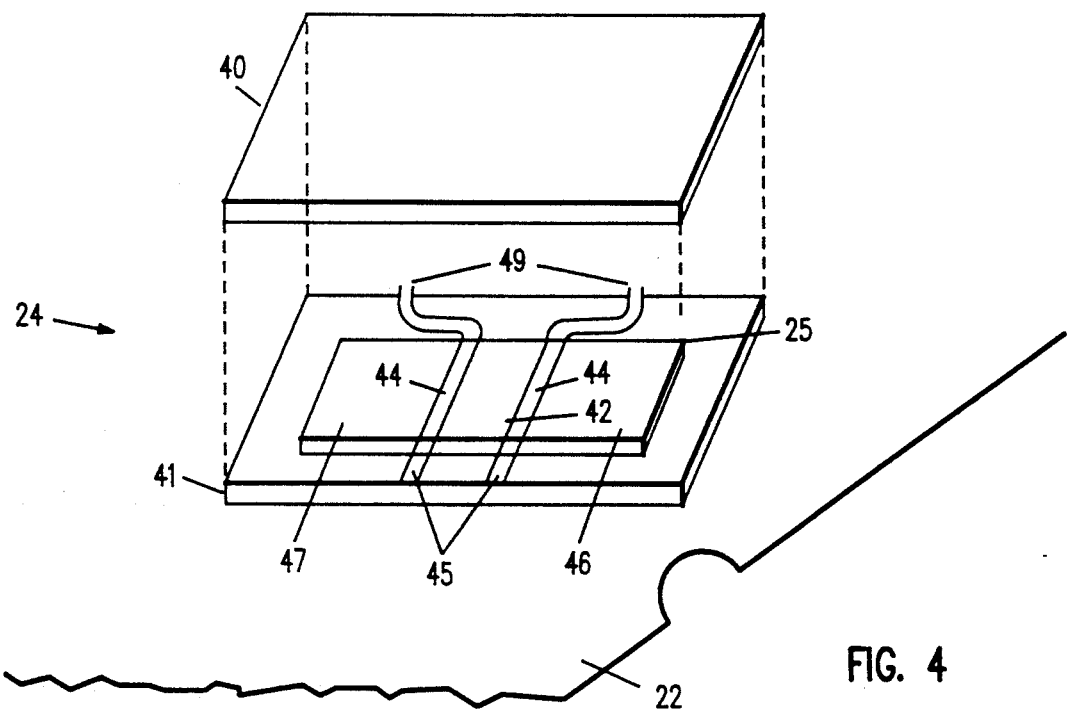
FIG. 4 is a partial isometric view of a printed circuit board having an embodiment of the present invention with its cover removed.

FIG. 4 is a partial isometric view of the printed circuit board 22 depicted and described in FIG. 3. Shock sensor 24 is shown in an electrically shielded case 41, having its top 40 removed, thereby exposing subassembly 25 comprised of a piezoelectric polymer film 42 disposed between top metallized layers 46 and 47 and lower metallized layer 50 (shown in FIGS. 6, 7 and 8). Metallized layers 46 and 47 may be deposited on film 42 by a variety of manufacturing processes and in one embodiment each layer was comprised of aluminum that was sputtered on film 42. Layer 50 may be any common substrate and in one embodiment was comprised of beryllium copper. Subassembly 25 is rigidly mounted by way of tension members 44 (and tension members 43, shown in FIGS. 4A and 4B) having electrical leads 45 extending therefrom (Electrical leads 49 extend from tension members 43). Tension members 44, 43 and leads 45, 49 may be of any conductive material and in one embodiment were each comprised of beryllium copper. The electrical leads may be an integral part of the respective tension member or may be permanently affixed to the tension member by any variety of common manufacturing techniques such as soldering, pressing or riveting. Embodiments of the present invention were mounted on a printed circuit board by infrared reflow soldering and hand soldering with substantially equal results.

FIG. 4 further illustrates that the relatively planar shock sensor is mounted in such a manner that the plane of the sensor intersects the x, y and z axis of the printed circuit/drive board 22 (FIG. 3) at an angle of forty-five degrees. Orientation of shock sensor 24 in this manner allows for maximum sensitivity of the planar sensor to both torsional and linear forces applied to the disk drive device.

Figure 4A:
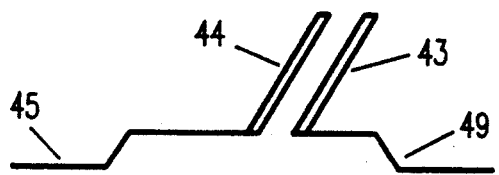
FIG. 4A is a cross-sectional view of the tension members and electrical leads of the present invention.

FIG. 4A is a cross-sectional view of front and rear tension members 44 and 43, respectively and electrical leads 45 and 49 of the present invention. The polymer thin film and metallized layers (not shown) would be disposed in the gap between tension members 43 and 44 during normal operation. Contact between the metallized layers of the polymer thin film element and the tension members also serves as an electrical connection for the apparatus. Electrical lead 45 is an integral part of tension member 43, extending away from the adjacent surface of the piezoelectric polymer thin film element. In like fashion, electrical lead 49 is integral to and extends away from tension member 44.

Figure 4B:
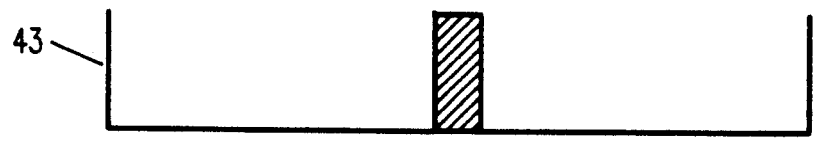
FIGS. 4B and 4C are longitudinal views of the back and front tension members respectively.
Figure 4C:
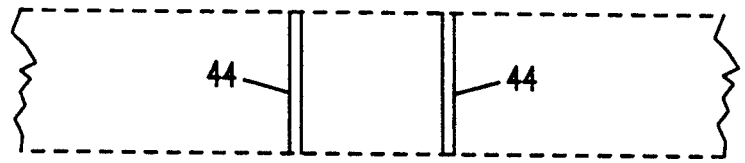

FIGS. 4B and 4C are longitudinal views of the back and front tension members respectively. FIG. 4B illustrates the face of tension member 43 that is in contact with the piezoelectric polymer thin film element. Similarly, FIG. 4C illustrates front tension members 44 with the metallized piezoelectric polymer thin film element partially shown in dashed lines. It is important to note that since the front and rear tension members also serve as electrical connections, each must be in contact with a metallized surface of the piezoelectric polymer thin film element. Additionally the location of the support members should be symmetrical or otherwise compensate for electrical equivalencies of their respective sensing circuit.

Figure 4D:
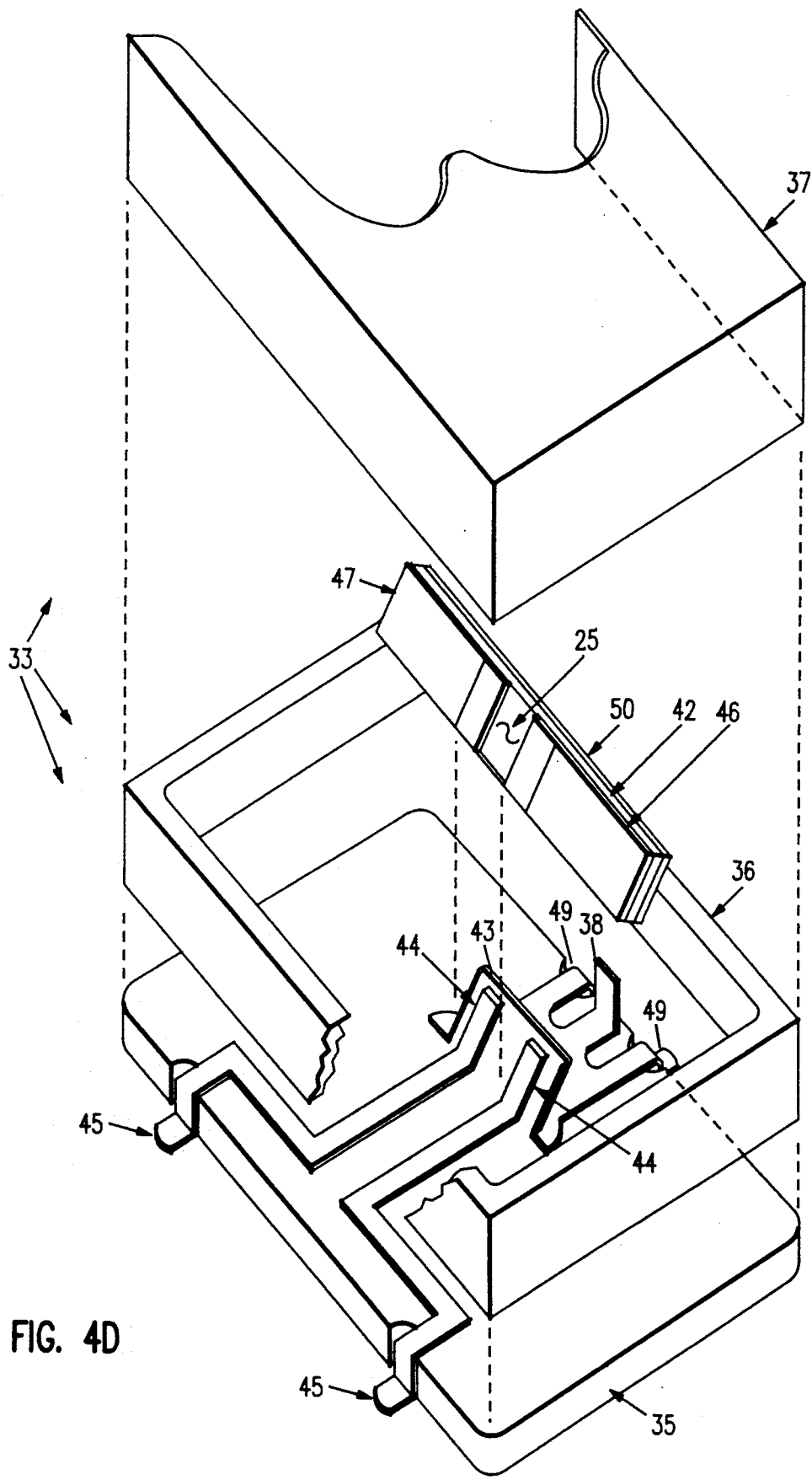
FIG. 4D is an exploded isometric view of an alternate embodiment of the packaged present invention.

FIG. 4D illustrates an alternate embodiment of shock sensor 24. Subassembly 25, tension members 43, 44 and electrical leads 45, 49 are each of similar composition and general manufacture as earlier described. Encapsulation device 33 (as shown having three elements), is comprised of an injection molded thermoplastic base member 35 for receiving the tension members 43, 44 and electrical leads 45, 49. Base member 35 may provide electrical shielding by including sufficient carbon or other similar functioning items in the thermoplastic composition. Alternatively, base shielding may be provided by the shielding capability of the PCB (22 in FIG. 4) in which case base member 35 could be eliminated from the device with the tension members and leads directly affixed to the printed circuit board. A rectangular shaped, thermoplastic injected molded member 36 has dimensions complimentary to base member 35 and of height slightly in excess of mounted subassembly 25. Rectangular member 36 provides structural integrity to encapsulation device 33. A five sided metallic cover 37 is of slightly larger length and width dimensions than rectangular member 36 and provides a top for device 37 in addition to side and top electrical shielding. Protrusion 38, integral to electrical leads 49, extends away from base member 35 in an upward fashion contacting and thereby providing a ground connection for cover 37. Other grounding alternatives for cover 37 are also possible. It should also be noted that electrical leads 45, 49 and tension members 43, 44 serve as heat sinks during fabrication and mounting of the shock sensor.

Figure 5:
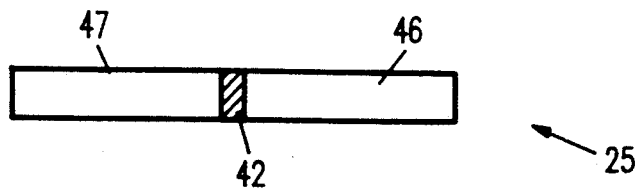
FIG. 5 is a top view of the piezoelectric polymer of the present invention removed from its package.
Figure 6:
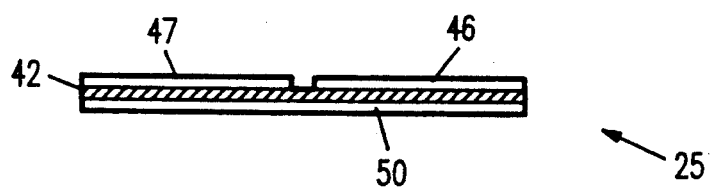
FIG. 6 is a side view of the piezoelectric polymer of the present invention removed from its package.
Figure 7:
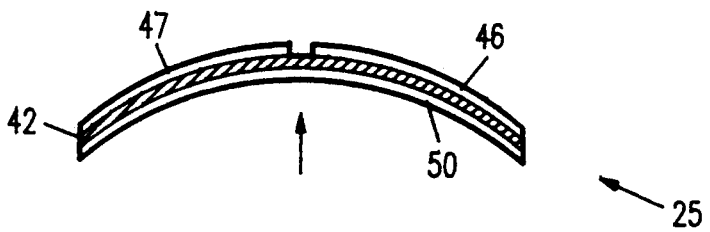
FIG. 7 is a side view of the piezoelectric polymer of the present invention removed from its package and distorted by an exerted force.
Figure 8:
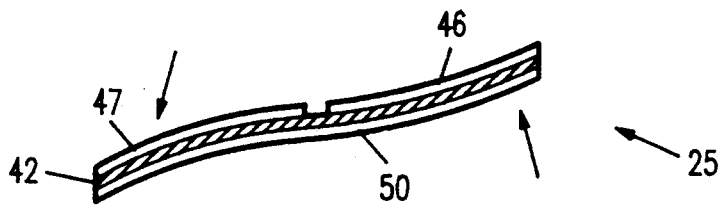
FIG. 8 is a side view of the piezoelectric polymer of the present invention removed from its package and distorted in a torsional fashion.

FIGS. 5, 6, 7 and 8 illustrate the piezoelectric polymer film 42 contained in the shock sensor 24 in a variety of prospectives. FIGS. 7 and 8 specifically show the shock sensor deformed in response to a force, represented in the figures as an arrow or arrows. The shock sensor utilized in one embodiment contains a piezoelectric polymer material 42 manufactured in accordance with known prior art techniques. The piezoelectric polymer film used in the present invention was extruded, stretched, polarized and deposited upon a metallized substrate with segmented metallized top layers and was obtained from Atochem North America, Inc. of Valley Forge, Pa. The piezoelectric polymer material may be comprised of polyvinylidene fluoride (PVDF) and may be manufactured of various compositions in a variety of manners as described in U.S. Pat. Nos. 4,946,913, 4,921,928 and 4,427,609.

Figure 10:
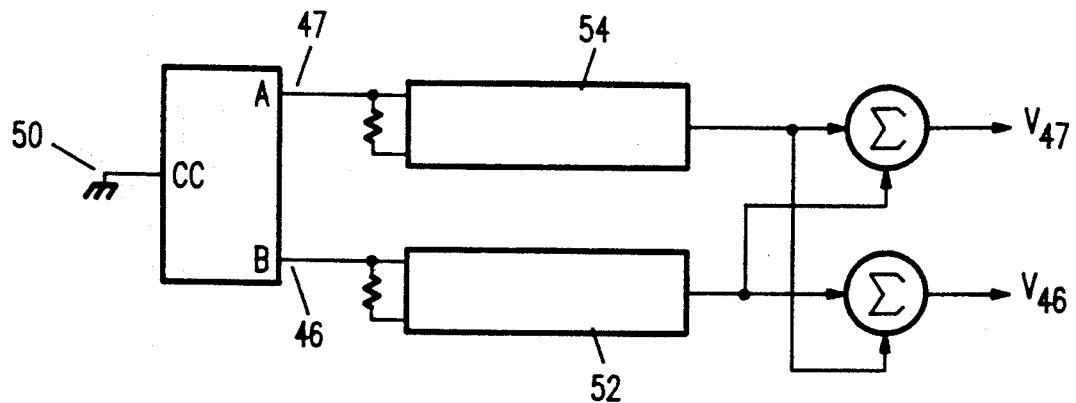
FIG. 10 is a block diagram of bootstrapping electrical circuitry for connecting the shock sensor of the present invention to control circuitry.

FIG. 10 depicts a block diagram of circuitry utilized for connecting the output response of shock sensor 24 to control circuitry which accordingly issues a write fault signal when signals above a predetermined threshold are detected. The generated signal $V_{46}$ and $V_{47}$ are individually amplified and compared to reference (threshold) voltages. The circuitry illustrated in FIG. 10 is well known in the prior art and may be varied in numerous manners according to particular applications or desires.

Up until now the physical construction of the disk drive incorporating the piezoelectric shock sensor of the present invention has been described in detail. The functionality of the device will now be described. One embodiment of the shock sensor is illustrated in FIG. 6 and shows the piezoelectric material 42 disposed between a metallized bottom layer 50 and metallized layers 46 and 47 on top of the piezoelectric material. When the structure of FIG. 5 or 6 is supported by the tension members described in FIGS. 4, 4A, 4B and 4C, a pair of cantilevered beams are formed, one being associated with metallized layer 46 and the other with metallized layer 47. Each beam has an associated voltage proportional to movement or stress exerted against it.

Figure 11:
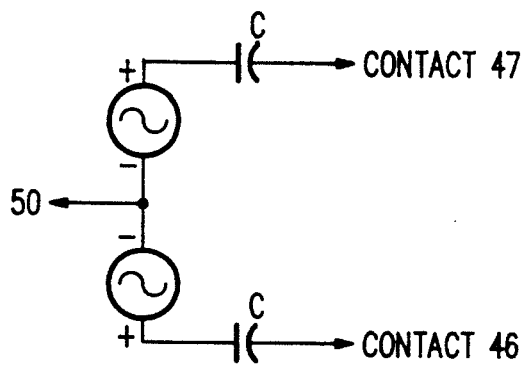
FIG. 11 is a block diagram of illustrating the electrical equivalent of the shock sensor of FIG. 7.

FIG. 7 illustrates deflection of the piezoelectric material upon application of force in the plane of the sensor. The resultant instantaneous electrical equivalent circuit for the deflection illustrated in FIG. 7 is shown in FIG. 11. Voltage along metallized layer 47 is defined as $V_{47}$ and voltage along metallized layer 46 is correspondingly defined as $V_{46}$. $V_{47}$ equals $V_{46}$ when no force is exerted upon the shock sensor. Accordingly, the following equations are known to be true.

| LINEAR SHOCK | Equation 1) | $V_{47} = V_{46}$ |
|---|---|---|
| | Equation 2) | $V_{47} + V_{46} = 2V_{47}$ |
| | Equation 3) | $V_{47} - V_{46} = 0$ |
| TORSIONAL SHOCK | Equation 4) | $V_{47} = -V_{46}$ |
| | Equation 5) | $V_{47} + V_{46} = 0$ |
| | Equation 6) | $V_{47} - V_{46} = 2V_{47}$ |

Figure 12:
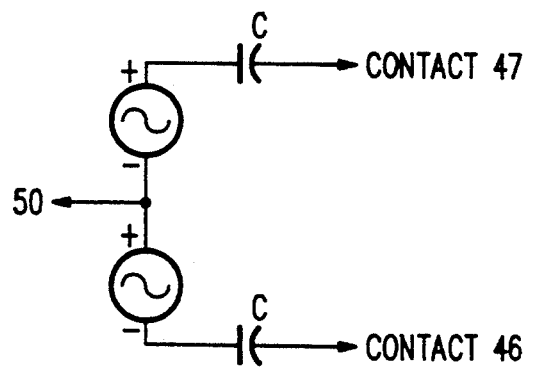
FIG. 12 is a block diagram illustrating the electrical equivalent of the shock sensor of FIG. 8.

When an external force is applied in such a manner to produce torque, deflection of the piezoelectric sensor may be as shown in FIG. 8. The resulting instantaneous electrical circuit for torque deflection of the shock sensor is depicted in FIG. 12. By utilizing the assumptions set forth in the above equations, the shock sensor may serve as a device in which simple addition or subtraction of output voltages or signals can provide information regarding the magnitude, direction and torsional information of any applied force. By varying the mechanical orientation of the transducer, forces of a variety of planes and torsions may be monitored or sensed.

Figure 9:
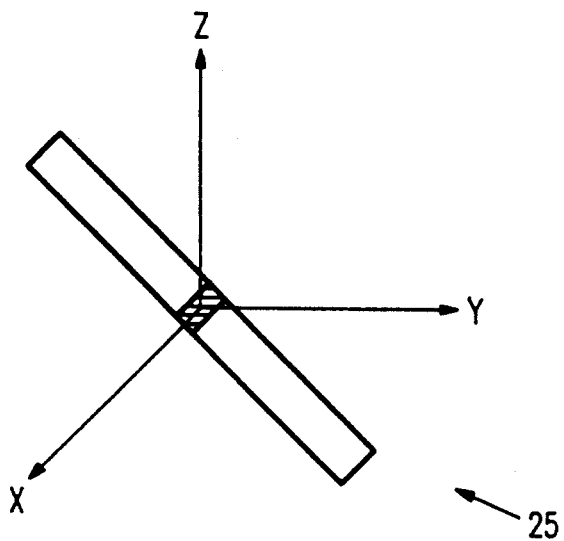
FIG. 9 is a view of the piezoelectric polymer of the present invention depicted in a forty-five degree angle to the x, y, and z axis of the orthogonal coordinate system.

In one embodiment of the present invention, such as FIGS. 4 and 9, the shock sensor is oriented at a forty-five degree angle to the x, y, and z orthogonal axis of the printed circuit board and disk drive apparatus. The resulting device provides linear and torsional outputs for external forces applied in any direction.

The electrical equivalent circuit of the device may be represented as a capacitor and does not have a DC content. The value of the capacitor is a function of piezoelectric film thickness and the metallized area. A value of 30 picofarads is typical for a device having dimensions of 0.35 inches length, 0.05 inches width and 0.028 inches thickness, similar to what has been utilized in the above described embodiment.

Figure 13A:
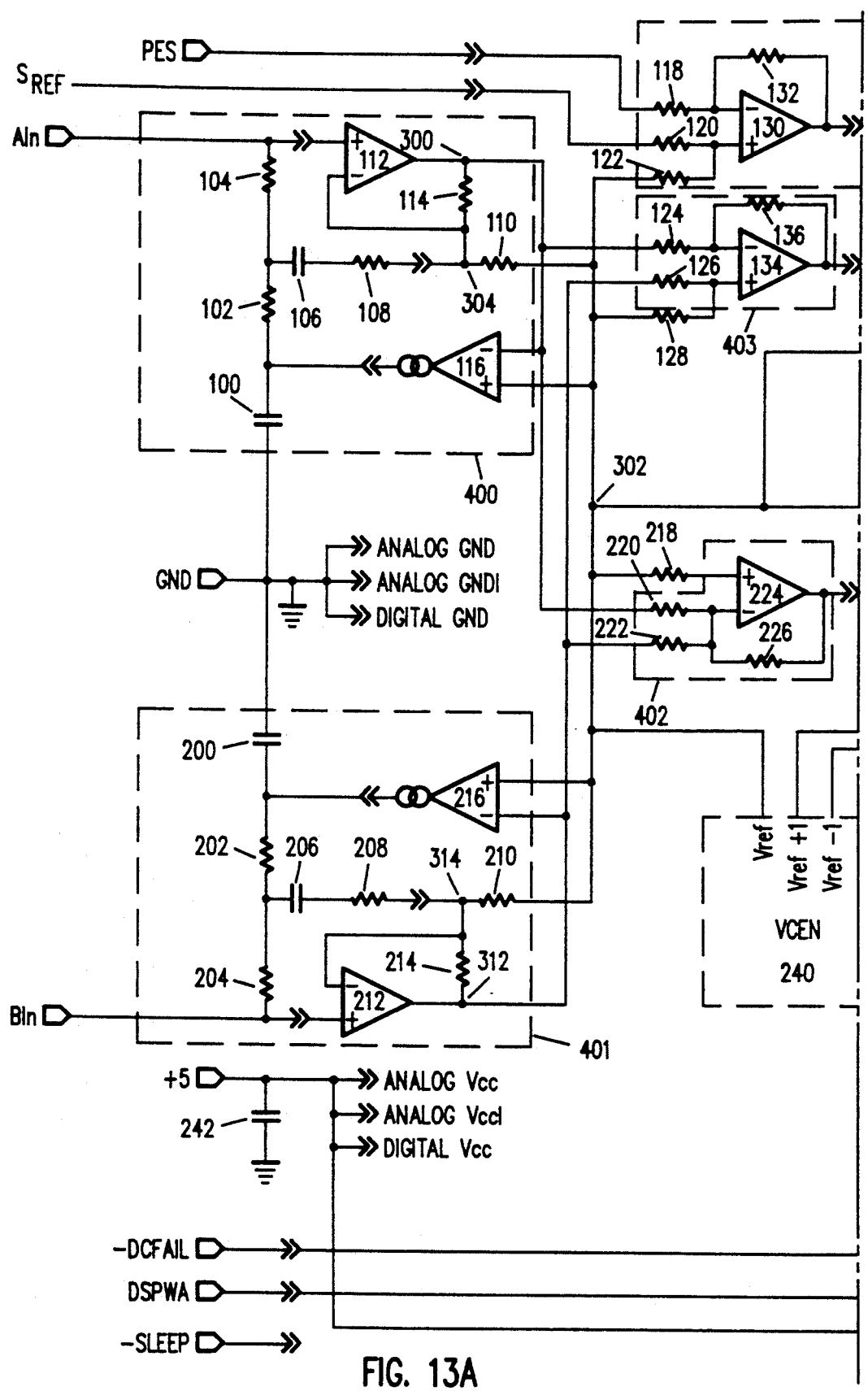
FIG. 13 is a schematic circuity diagram for connecting the transducer of the present invention to control circuitry.
Figure 13B:
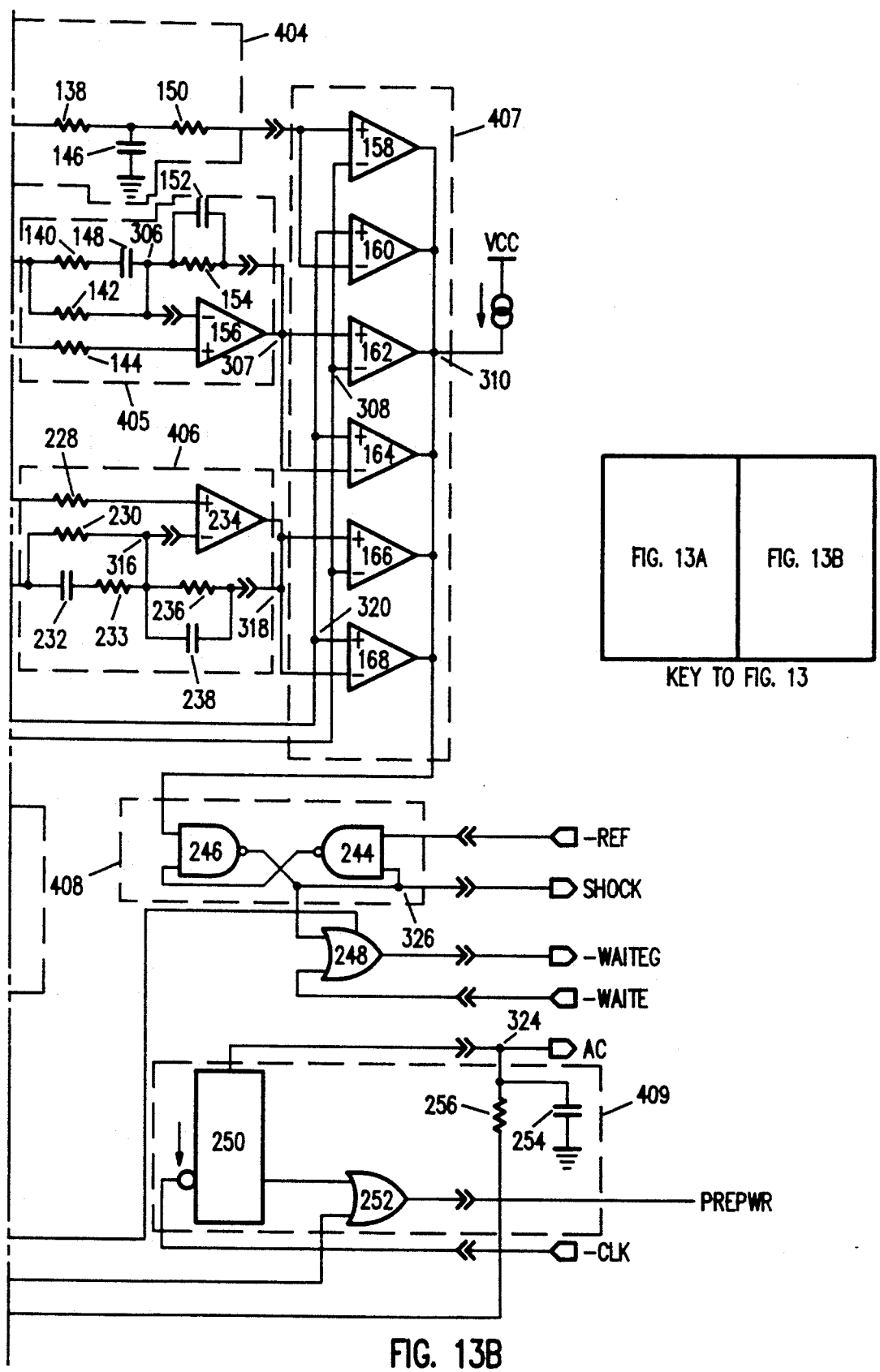

External forces proportional to the dimensions of the shock sensor for small disk drive units generate low frequency signals. For low frequency response, a load impedance must be very high in order for the sensor device to be functional. An amplification circuit 52 and 54 for each output signal $V_{46}$ and $V_{47}$, respectively, is required. FIGS. 10 and 13 illustrate such circuitry in block and schematic diagram form. The block diagram of FIG. 10 provides the following equations for calculating voltages $V_{46}$ and $V_{47}$.

| Equation 7) | $V_{46} = F(S) [V_A - V_B]$ |
| --- | --- |
| Equation 8) | $V_{47} = F(S) [V_A + V_B]$ |

Where
S = the LaPlacian operator
$V_A$ = the voltage at A
$V_B$ = the voltage at B FIG. 13 specifically illustrates biasing circuitry to operate the shock sensor on a single polarity voltage supply, amplification circuitry and for producing a proportional signal to the signal emitted by the sensor and comparator circuitry for evaluating amplified signal $V_{46}$ or $V_{47}$ to a predetermined threshold. When threshold voltages are exceeded the actuator of hard disk drive is given a signal which forces the magnetic head out of the write mode of operation and a latch is set to notify the controller that a externally induced shock of excessive magnitude has been detected.

The circuitry depicted in FIG. 13 may be manufactured by a variety of integrated circuit manufacturers skilled and tooled in the art of producing semi-custom or custom devices. For purposes of the present invention SGS Thompson of Grenoble, France provided BiCMOS integrated circuit devices implementing the specific design of FIG. 13 that were prepared under a proprietary agreement between SGS Thompson and Seagate Technology, Inc.

FIG. 13 depicts in dashed lines a block diagram of two input amplifiers 400 and 401, a voltage generator 240, summation amplifier 402, differencing amplifier 403, PES amplifier 404, gain setting amplifiers 405 and 406, comparator 407, set/reset flip-flop 408 and multivibrator 409. The component circuitry and functionality of the foregoing blocks will next be described.

A first terminal of capacitor 100 is coupled to a common ground source. A second terminal of capacitor 100 is coupled to a first terminal of resistor 102 and the output of voltage to current converter 116. Resistor 102 has its second terminal coupled in common to a first terminal of resistor 104 and a first terminal of capacitor 106. Resistor 104 has a second terminal coupled to a first input of amplifier 112. The first input to amplifier 112 is also coupled to signal $A_{IN}$. The output of amplifier 112 is coupled through node 300 which is coupled to resistor 114. Resistor 114 is coupled in turn to a second input to amplifier 112 and to node 304.

Components 100, 102, 104, 106, 108, 110, 112, 114 and 116 comprise input amplifier 400. An input signal $A_{IN}$ is received by amplifier 112. This signal is then amplified by the closed loop gain portion of amplifier 112. The closed loop gain of amplifier 112 may be represented by the following equation:

$$A112_{CL} = A112_{OL}/[1 + (A112_{OL})(R114)/R110)] \quad (9)$$

Where,
$A112_{CL}$ = value of the closed loop gain of amplifier 112
$A112_{OL}$ = value of the open loop gain of amplifier 112
$R114$ = the value of resistor 114
$R110$ = the value of resistor 110.

The signal at node 300 is compared to $V_{REF}$ by voltage to current convertor 116 and the difference converted to a current coupled to capacitor 100. The voltage developed on capacitor 100 is summed with the AC input signal at $A_{IN}$ thereby establishing the operating point for amplifier 112. The above described circuitry forms a self regulating amplifier having a known DC operating point.

The AC input signal at $A_{IN}$ is shown in FIGS. 11 and 12 as comprising a voltage source coupled in series with a capacitor. The low frequency corner of the frequency response of the system is thereby determined by the time constant of the input impedance at $A_{IN}$ and the value of the shock sensor coupling capacitor. If a low frequency response of 100 Hertz is required, the resistance at $A_{IN}$ must be greater than 53 Megohms. This value is too large to economically be placed on a printed wiring board, therefore the signal at node 304 is fedback to the second terminal of resistor 104 through resistor 108 and capacitor 106. Since the voltage at node 304 is very close to the voltage at $A_{IN}$ there is very little current flow through resistor 104 thereby simulating a much larger resistance. The effective resistance value of resistor 104 may be expressed as follows:

$$R104_{EFF} = R104_{ACT}(1 + [(A11-2_{OL})(R110)/(R110 + 114)]) \quad (10)$$

Where,
$R104_{EFF}$ = effective value of resistor 104
$R104_{ACT}$ = actual value of resistor 104
$A112_{OL}$ = value of the open loop gain of amplifier 112
$R114$ = the value of resistor 114
$R110$ = the value of resistor 110.

Capacitor 106 is utilized for DC blocking. As the value of resistor 108 is varied the damping ratio of the closed loop low frequency response also is varied. Resistor 108 may therefore be utilized to compensate for stray impedances at $A_{IN}$.

Node 300 is also coupled through resistor 124 and into a first terminal of amplifier 134 and directly to a first input of amplifier 116. A second input to amplifier 116 is received from node 302. Capacitor 106 has a second terminal coupled through resistor 108 and to node 304. Node 304 is coupled through resistor 110 and 128 to a second input of amplifier 134. The output of amplifier 134 is coupled in common to a first terminal of resistors 136, 140 and 142. Resistor 136 has a second terminal coupled to the first input of amplifier 134. Resistor 140 has its second terminal coupled through capacitor 148 to node 306. Resistor 142 also has its second terminal coupled to node 306. Node 306 is coupled in common a first input to capacitor 152 and resistor 154 each having a second terminal coupled in common to node 307.

Differencing amplifier 403, is comprised of resistors 124, 126, 128, 136 and amplifier 134 and measures the difference in the signals at node 300 and node 312 respectively.

$S_{REF}$ signal is coupled through resistor 120 to a first input of amplifier 130. Node 302 is also coupled to the first input of amplifier 130 through resistor 122. PES signal is coupled through resistor 118 to a second input to amplifier 130. The output of amplifier 130 is coupled in common to a first terminal of resistor 132 and 138 respectively. Resistor 132 has a second terminal coupled to the second input of amplifier 130. Resistor 138 has a second terminal coupled to grounded capacitor 146 and through resistor 150 to a first input of comparator 158. A second input to comparator 158 is received from node 308. The output of comparator 158 is coupled to node 310.

PES amplifier 404, is comprised of resistors 118, 120, 122, 132, 138, 150, amplifier 130 and capacitor 146. PES amplifier processes an input Signal $_{PES}$ received from the disk drive servo position error signal that is low passed at a frequency dependent upon the respective values of resistors 138, and 150 as well as the value of capacitor 146, thereby providing for a frequency response for external shocks that extend down to a DC signal.

A first terminal of capacitor 200 is coupled to a common ground source. A second terminal of capacitor 200 is coupled to a first terminal of resistor 202 and the output of voltage to current convertor 216. Resistor 202 has its second terminal coupled in common to a first terminal of resistor 204 and a first terminal of capacitor 206. Resistor 204 has a second terminal coupled to a first input of amplifier 212. The first input of amplifier 212 is also coupled to signal $B_{IN}$. The output of amplifier 212 is coupled in common to node 312 which is coupled to resistor 214 feeding back to amplifier 212 and coupled to node 314.

The functionality of input amplifier 401 is the same as described for input amplifier 400 above and reference is herein made to the above description.

Node 312 is also coupled through resistor 222 and into a first terminal of amplifier 224 and directly to a first input of voltage to current convertor 216. The first input of voltage to current convertor 216 is coupled through resistor 126 to the second input of amplifier 134. Resistor 220 is disposed between the first input amplifier 224 and 116 respectively. A second input to amplifier 216 is received from node 302. Capacitor 206 has a second terminal coupled through resistor 208 and to node 314. Node 314 is coupled through resistor 210 and 218 to a second input of amplifier 224. The output of amplifier 224 is coupled in common to a first terminal of resistors 226, 230 and capacitor 232. Resistor 226 has a second terminal coupled to the first input of amplifier 224.

Summation amplifier 402 is comprised of resistors 220, 222, 226 and amplifier 224 and provides for the summation of the voltages at nodes 300 and 312. Resistor 218 is utilized for bias current compensation for amplifier 224.

Resistor 230 has its second terminal coupled through node 316 to a first input of amplifier 234. Capacitor 232 has a second terminal coupled through resistor 233 and to node 316. Node 316 has a first terminal of capacitor 238 and resistor 236 coupled in common, each having a second terminal also coupled in common to node 318. Signal $V_{REF}$ is coupled from $V_{GEN}$ 240 to node 302. Signal $V_{REF+1}$ is coupled from $V_{GEN}$ 240 to node 320. Signal $V_{REF-1}$ is coupled from $V_{GEN}$ 240 to node 308. $V_{GEN}$ generates three DC voltages. The first of these voltages is $V_{REF}$ and is utilized as the reference voltage for the analog portions of the recorded signal thereby allowing operation with a single polarity voltage supply. The other two generated DC voltages are $V_{REF+1}$ and $V_{REF-1}$, respectively representing signal $V_{REF}$ plus one volt and minus one volt, respectively. The one volt increment is arbitrary and some other voltage threshold could also be utilized.

Node 318 is coupled to a first input of each of comparators 166 and 168. Node 320 is coupled to a first input of comparators 160 and 164 and to a second input of comparator 168. The outputs of comparators 160, 164 166 and 168 are each coupled directly to node 310.

Comparators 158, 160, 162, 164, 166 and 168 detect when any of the input voltages differ from $V_{REF}$ by more than one volt. Each output of the comparators is connected in such a manner that if any one or more of these input voltage levels is outside of windows established by $V_{REF+1}$ and $V_{REF-1}$ a digital signal will be generated at node 310.

Node 302 is coupled through resistor 144 to a first input of amplifier 156. A second input to amplifier 156 is received from node 306. The output of amplifier 156 is coupled through node 307 to a first input of comparator 162 and a second input of comparator 164. Additionally, node 302 is coupled through resistor 228 to a first input of amplifier 234. A second input to amplifier 234 is received from node 316. The output of amplifier 234 is coupled to node 318.

Gain setting amplifier 405 is comprised of resistors 140, 142, 144, 154, capacitors 148, 152 and amplifier 156. Gain setting amplifier 405 calibrates signal gains such that a known level of acceleration will result in a signal level at node 307 that is equal to one volt of displacement from signal $V_{REF}$. Resistor 144 provides bias current compensation for amplifier 156, while components 140, 142, 148, and 152 each provides gain setting and frequency response shaping to match a particular application. Gain setting amplifier 406 is depicted below 405 and has similar construction and function.

Clock signal CLK is coupled to one input of flip-flop 250. Flip-flop 250 has a second connection to node 324 and a third connection to a first input of OR gate 252 (a tri-stated OR gate). OR gate 252 has a second input coupled to signal DSPWR. The output of OR gate 252 is PREPWR signal and connects to control circuitry (not shown).

Signal RFF is coupled to a first input of AND gate 244. The output of AND gate 244 is coupled to a first input to AND gate 246. A second input to AND gate 246 is received from node 310. Items 244 and 246 comprise a set/reset flip-flop device 408 that is active on negative going signals. The output of AND gate 246 is coupled in common to a first input of OR gate 248, a second input to AND gate 244 via node 326 and to control circuitry (not shown). Signal WRITE and signal DCFAIL provide a second and third input respectively, to OR gate 248. Signal WRITEG is coupled from OR gate 248 with control circuitry (not shown) for issuing a write fault signal.

A signal +5 is coupled to a grounded capacitor 242, which is an external decoupling capacitor for the externally supplied power.

Items 250, 252, 254 and 256 form a monostable multivibrator that is utilized for power management of the circuit as well as other portions of the disk drive circuit.

By utilizing the teachings of the present invention, disk drive units may be effectively operated in environments which routinely expose such drives to large external mechanical shocks. The present invention may be embodied in different forms without departing from the spirit or essential attributes.

It is intended that the appended claims be interpreted as including the above described embodiments in addition to alternate configurations within the scope of the present invention.

I claim:

1. A shock and load detection device mounted on a disk drive unit comprising:
    a relatively rectangular disc drive having at least three intersecting sides; and
    a relatively planar shock sensor mounted on said disc drive; the plane of said shock sensor intersecting each of the planes of said three sides at oblique angles.

2. The apparatus of claim 1, wherein the sensor comprises a piezoelectric polymer film.

3. The apparatus of claim 2, further comprised of:
    amplifier means connected to the sensor means for producing a voltage signal proportional to the electrical charge received from the sensor means; and
    comparator means connected to the amplifier means for evaluating the voltage signal to a predetermined threshold voltage, corresponding to a known acceleration level, and issuing a write-fault signal to suspend magnetic recording, when the voltage signal received by the comparator means exceeds the predetermined threshold voltage.

4. The apparatus of claim 2, further comprising a metallic case encapsulating the piezoelectric polymer film for electrical shielding purposes.

5. The apparatus of claim 2, further comprising a case having a metallized coating encapsulating the piezoelectric polymer film for electrical shielding purposes.

6. The apparatus of claim 2 mounted on the drive in such a manner so that the piezoelectric polymer film rests approximately 45° to the x, y and z axis of the orthogonal coordinate system.

7. The apparatus of claim 2 wherein the piezoelectric polymer film is mounted within the metallic case at a 45° angle longitudinally.

* * * * *